(12) United States Patent
Wang et al.

(10) Patent No.: US 8,457,943 B2
(45) Date of Patent: Jun. 4, 2013

(54) SYSTEM AND METHOD FOR SIMULATING A MULTIPROCESSOR SYSTEM

(75) Inventors: Huayong Wang, Beijing (CN); Kun Wang, Beijing (CN); Honesty C. Young, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 1202 days.

(21) Appl. No.: 12/038,589

(22) Filed: Feb. 27, 2008

(65) Prior Publication Data

US 2008/0208558 A1   Aug. 28, 2008

(30) Foreign Application Priority Data

Feb. 27, 2007   (CN) .......................... 2007 1 0084322

(51) Int. Cl.
*G06F 17/50* (2006.01)

(52) U.S. Cl.
USPC .......................................................... 703/14

(58) Field of Classification Search
USPC ............................................... 703/14, 16, 19
See application file for complete search history.

(56) References Cited

U.S. PATENT DOCUMENTS 6,230,313 B1 * 5/2001 Callahan et al. .............. 717/128
6,466,898 B1 * 10/2002 Chan .............................. 703/17

OTHER PUBLICATIONS

Chidester et al, "Parallel Simulation of Chip-Multiprocessor Architectures", Jul. 2002, ACM Transactions on Modeling and Computer Simulation, vol. 12, No. 3, pp. 176-200.*
Bohrer et al., "Mambo—A Full system Simulator for the PowerPC Architecture", Mar. 2004, ACM Sigmetrics Performance Evaluation Review, vol. 31 Issue 4, pp. 1-5.*
Bechem et al., "An Integrated Functional Performance Simulator", Jun. 1999, IEEE Micro, pp. 1-10.*

* cited by examiner

*Primary Examiner* — Rehana Perveen
*Assistant Examiner* — Hung Havan
(74) *Attorney, Agent, or Firm* — Ido Tuchman; William J. Stock

(57) ABSTRACT

Techniques for simulating a multiprocessor system. Aspects of the present invention are based on such an observation that most memory accesses from different simulated processors do not conflict, and therefore the conservative policy for performing synchronization of all the memory accesses can waste a large amount of processing time. By identifying possibly conflicting memory accesses and only performing synchronization of these memory accesses, the synchronization cost can be reduced considerably. Since the function simulator is able to operate faster and to perform the same memory accesses, the possibly conflicting memory accesses can be identified by first executing the function simulator.

19 Claims, 4 Drawing Sheets

SYSTEM AND METHOD FOR SIMULATING A MULTIPROCESSOR SYSTEM

CROSS-REFERENCE TO RELATED APPLICATIONS

This application claims priority under 35 U.S.C. §119 to Chinese Patent Application No. 200710084322.9 filed Feb. 27, 2007, the entire text of which is specifically incorporated by reference herein.

BACKGROUND OF THE INVENTION

The present invention relates to simulating a multiprocessor system, and especially relates to a simulating system and method for simulating a multiprocessor system.

A cycle-accurate simulator is an important tool in evaluating the design alternatives of multiprocessor systems. As the number of processors increases, the conventional sequential simulation techniques show their drawbacks of extreme slow speeds. Parallel simulation techniques are natural extensions to the sequential simulation techniques for purpose of higher speeds. However, a challenge in parallel simulation is to ensure that memory accesses are performed in a globally consistent order, i.e., respective memory accesses are synchronized with the global progress (global time). For example, it is assumed that a parallel simulating system including host processors A and B is used to simulate behaviors of two processors a and b, wherein processor a is simulated by host processor A to write memory unit c, and processor b is simulated by host processor B to read memory unit c. Then the memory accesses must be synchronized in a globally consistent order, otherwise erroneous results will occur. Conventional solutions to this problem comprise:

1) Per-cycle synchronization (see David A. Penry, Daniel Fay, David Hodgdon, Ryan Wells, Graham Schelle, David I. August and Daniel A. Connors, "Exploiting Parallelism and Structure to Accelerate the Simulation of Chip Multi-processors", Proceedings of the Twelfth International Symposium on High-Performance Computer Architecture (HPCA), February 2006). In this technique, all the simulated processors are synchronized at beginning of each cycle. Since a cycle is the minimum time unit, the correctness can be guaranteed. However, the simulation costs are extremely high due to too fine granularity, hence considerably reducing the overall simulation speed.

2) Barrier synchronization (see M. Chidister and A. George, "Parallel Simulation of Chipmultiprocessor architectures", ACM Transactions on Modeling and Computer Simulation, 12(3):176-200, July 2002). In this technique, all the simulated processors are synchronized every t time units, the total time of which must be less than the memory access latency to ensure the correctness. However, since the memory access latency is usually cycle-level, the synchronization costs are still high.

3) Memory access based on synchronization (see M. Chidister and A. George, "Parallel Simulation of Chipmultiprocessor architectures", ACM Transactions on Modeling and Computer Simulation, 12(3):176-200, July 2002). In this technique, all the simulated processors are synchronized each time a memory access is to be performed. However, the statistics shows that 30% to 40% of all the instructions are memory access instructions. Therefore the time costs for synchronization is still high.

FIG. 2 shows the general functional structure of a conventional cycle-accurate simulator. As shown in FIG. 2, a cycle-accurate simulator 20 usually comprises a fetching module 21, a decoding module 22, an issuing module 23, a functional unit 24, a writing back module 25, a committing module 26, a memory management unit (MMU) 27 and a memory hierarchical structure 28. For example, the modules and units as shown in the cycle-accurate simulator 20 may be implemented in hardware and/or software. A multiprocessor system may be simulated in parallel through a time-shared or parallel architecture. An example of the conventional cycle-accurate simulator may be available from SimpleScalar LLC located at Ann Arbor, Mich., USA (www.simplescalar.com).

As compared to the cycle-accurate simulator, the function simulator is faster in speed due to less consideration on microcosmic architectural details, and is still able to achieve the same memory access effect. FIG. 1 shows the general functional structure of a conventional function simulator. As shown in FIG. 1, a function simulator 10 usually comprises a fetching module 11, a decoding module 12, an execution module 13, a committing module 14, a memory management unit (MMU) 15 and a memory hierarchical structure 16. For example, the modules and units as shown in the cycle-accurate simulator 10 may be implemented in hardware and/or software. A multiprocessor system may be simulated in parallel through a time-shared or parallel architecture. An example of the conventional cycle-accurate simulator may be available from SimpleScalar LLC located at Ann Arbor, Mich., USA (www.simplescalar.com).

BRIEF SUMMARY OF THE INVENTION

In view of the above, aspects of the present invention provide a simulating system and method for simulation the multiprocessor system in order for increasing the cycle-accurate simulator's execution speed.

Aspects of the present invention are based on such an observation that most memory accesses from different simulated processors do not conflict, and therefore the conservative policy for performing synchronization of all the memory accesses can waste a large amount of processing time. By identifying possibly conflicting memory accesses and only performing synchronization of these memory accesses, the synchronization cost can be reduced considerably. Since the function simulator is able to operate faster and to perform the same memory accesses, the possibly conflicting memory accesses can be identified by first executing the function simulator.

An exemplary aspect of the present invention provides a simulating system for simulating a multiprocessor system, comprising a function simulator and a parallel cycle-accurate simulator, said function simulator further comprises an access record extracting module for obtaining a memory access record of an instruction, each of parallel simulation units of said parallel cycle-accurate simulator further comprises a memory access control module for providing information for identifying an instruction causing an access to a memory hierarchy structure, and said simulating system further comprises a synchronization control system, the synchronization control system comprising: identifying means for identifying sets of instructions, memory accesses of each set being necessary to be synchronized, according to memory access records of the instructions provided by said access record extracting module when the execution of an executable program by said multiprocessor system is simulated in said function simulator; and synchronizing means for determining execution of instructions in one of said sets by said parallel simulation units according to said information provided by said memory access control module, so that the memory accesses of said instructions are performed in the order corresponding to global simulation times of the instructions, wherein said memory access control module is configured to hang up the execution of respective memory accesses before the completion of said synchronization, and resume the execution of the hung up memory accesses in response to a control from said synchronizing means.

Another aspect of the present invention provides a method of performing memory access synchronization control in a simulating system for simulation a multiprocessor system, said simulating system comprising a function simulator and a cycle-accurate simulator, the method comprising steps of: simulating, through said function simulator, the execution of an executable program by said multiprocessor system, wherein memory access records of instructions are obtained; identifying sets of instructions where each of the sets need a synchronization according to said memory access records of said instructions; and simulating, through said parallel cycle-accurate simulator, the execution of the executable program by said multiprocessor system, wherein each of parallel simulation units of said parallel cycle-accurate simulator is configured to provide information for identifying an instruction causing an access to a memory hierarchy structure so as to determine execution of instructions in one of said sets by said parallel simulation units according to said information, so that the memory accesses of said instructions are performed in the order corresponding to global simulation times of the instructions, and wherein said parallel simulation units are configured to hang up the execution of respective memory accesses before the completion of said synchronization, and resume the execution of the hung up memory accesses in said order.

A further aspect of the present invention further provides a computer program product embodying a computer program for executing the above method. As used herein, "computer readable medium" is any computer readable medium, with the sole exception being a transitory, propagating signal. "Computer program product" is defined as any manufactured product embodied in computer readable medium.

According to embodiments of the present invention, since it is able to determine possibly conflicting memory accesses through the simulation in the function simulator, it is possible to avoid synchronization of all the memory accesses in the later simulation in the cycle-accurate simulator, thereby considerably reducing the synchronization costs and increasing the simulation speed.

BRIEF DESCRIPTION OF THE SEVERAL VIEWS OF THE DRAWINGS

The accompanying drawings incorporated into the specification and forming a part of the specification illustrate embodiments of the present invention, and is used to illustrate the principle of the present invention along with the above general description and the following detailed description of the embodiments, wherein.

DETAILED DESCRIPTION OF THE INVENTION

The technical solution of the present invention will be described by referring to specific embodiments. In the following description, some specific details are provided in order to provide a detailed explanation to the embodiments of the present invention. However, one skilled in the art knows that the present invention can also be implemented without these details. Further, there is no detailed description on the known structures relating to computers, processors and so on, in order to prevent from unnecessarily obscuring the description of the present invention's embodiments.

It should be noted that, the sections for performing predetermined processing in the following embodiments may be implemented in hardware and/or software. For example, a specific processing may be performed using software and/or firmware executed on one or more processing modules. In general, a system for performing processing may include a more generic processing module and memory. The processing module can be a single processing device or a plurality of processing devices. Such a processing device may be a microprocessor, micro-controller, digital processor, microcomputer, a portion of the central processing unit, a state machine, logic circuitry, and/or any device that manipulates the signal. The memory may be a single memory device or a plurality of memory devices. Such a memory device may be a read only memory, a random access memory, a floppy disk memory, magnetic tape memory, erasable memory, a portion of a system memory, and/or any device that stores operational instructions in a digital format. Note that when the processing module implements one or more of its functions to be a state machine or logic circuitry, the memory storing in the corresponding operational instructions is embedded within the circuitry comprising the state machine and/or other logic circuitry. For example, such a system may be a circuit design tool having a compilable memory unit to facilitate implementation of memories as described herein.

Unless the context requires otherwise, throughout the specification and claims which follow, the word "comprise" and variations thereof, such as, "comprises" and "comprising" are to be construed in an open, inclusive sense, that is as "including, but not limited to."

Figure 1:
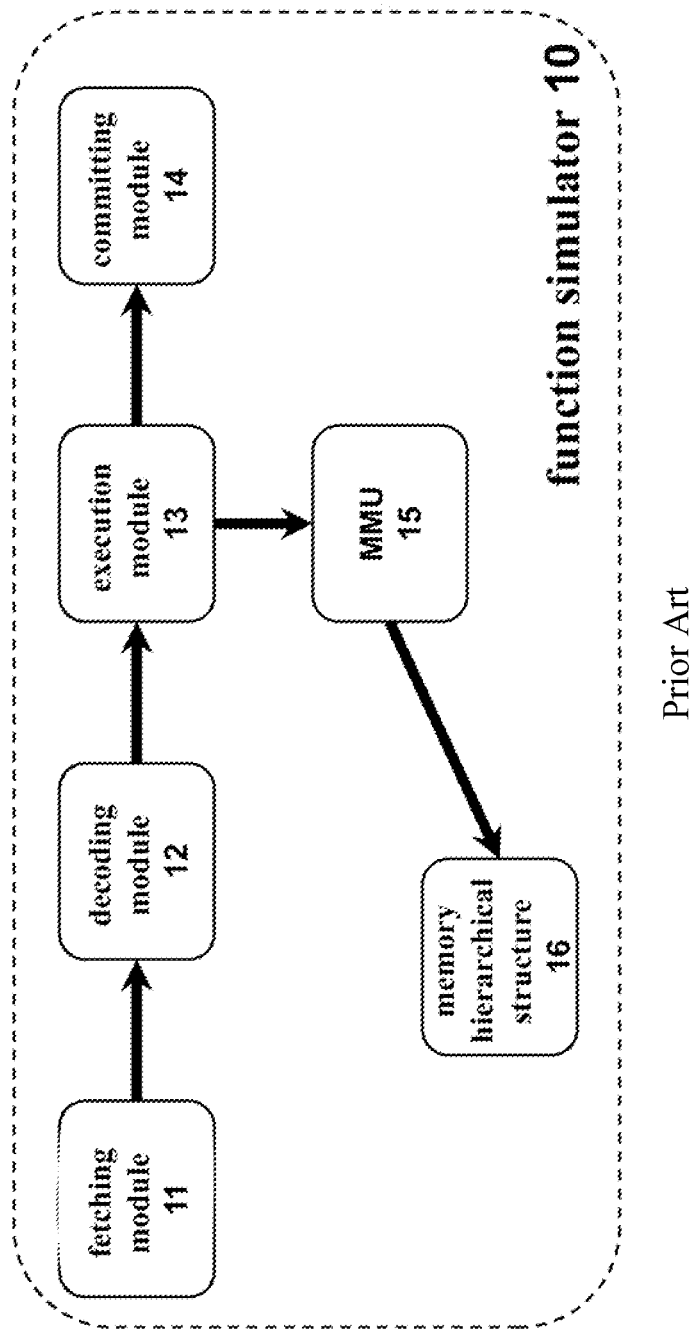
FIG. 1 is a block diagram showing general functional structure of a function simulator.
Figure 2:
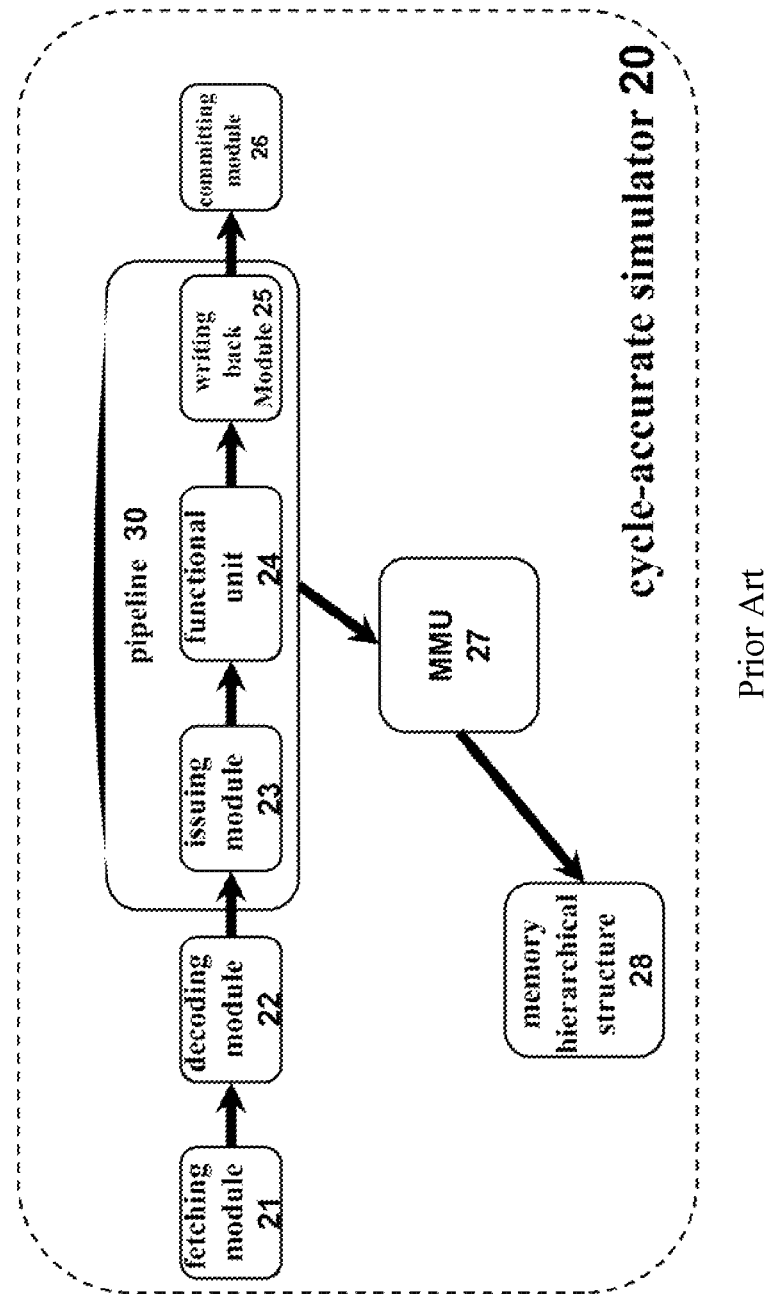
FIG. 2 is a block diagram showing general functional structure of a cycle-accurate simulator.
Figure 3:
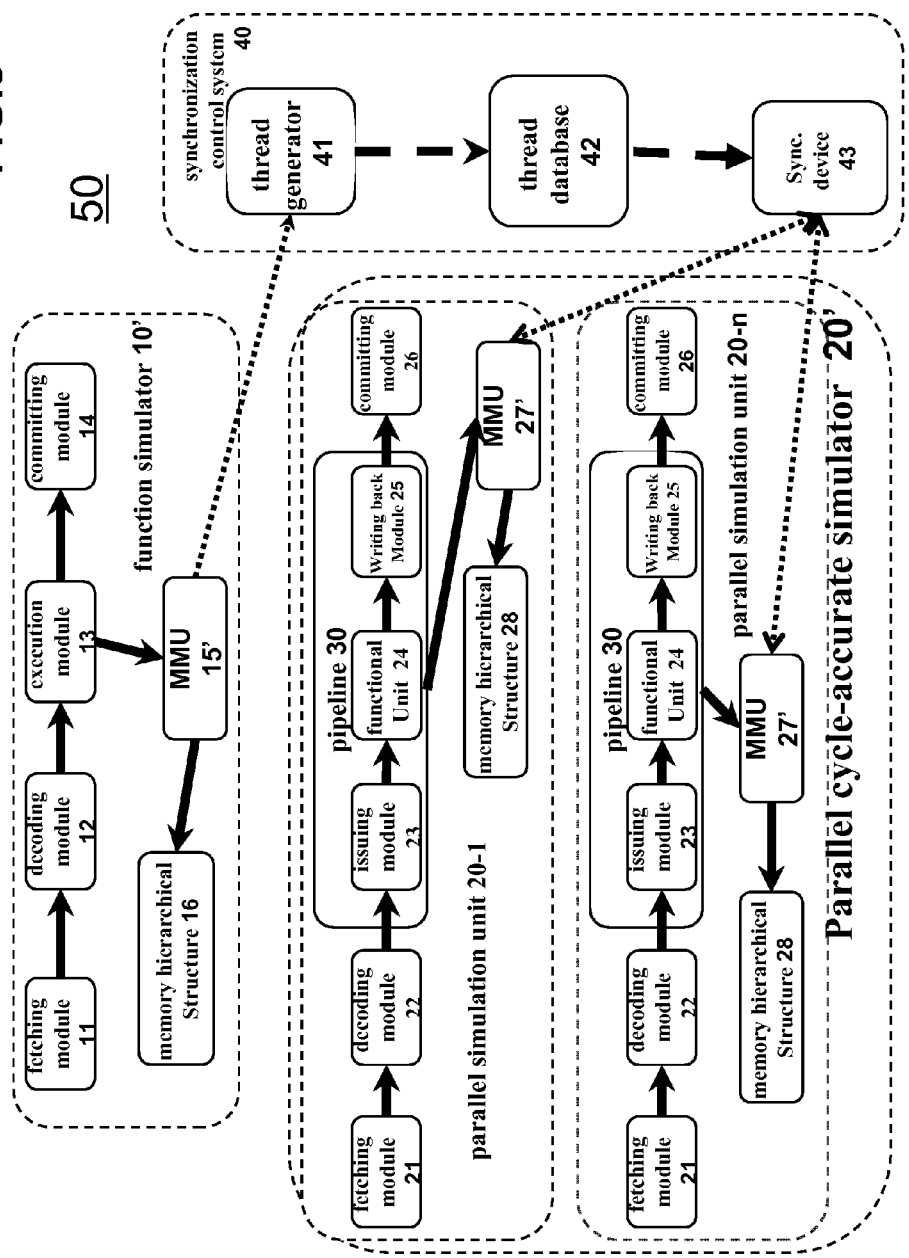
FIG. 3 is a block diagram showing an example of general functional structure of a simulating system according to an embodiment of the present invention.

FIG. 3 is a block diagram showing an example of general functional structure of a simulating system according to an embodiment of the present invention. As shown in FIG. 3, a simulating system 50 comprises a function simulator 10', a cycle-accurate simulator 20' and a synchronization control system 40 based on threads.

Figure 4:
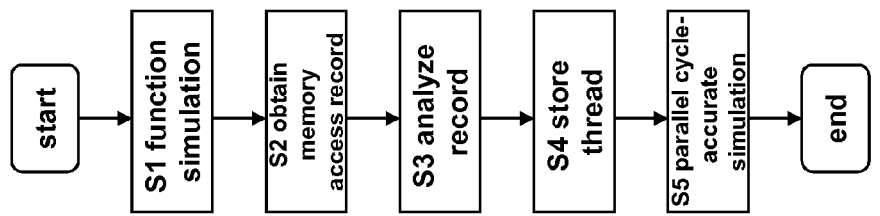
FIG. 4 is a flow chart showing general procedure of a simulation method according to an embodiment of the present invention.

FIG. 4 is a flow chart showing general procedure of a simulation method according to an embodiment of the present invention.

As shown in FIG. 3, the function simulator 10' comprises a fetch module 11, a decoding module 12, an execution module 13, a committing module 14, a MMU 15' and a memory hierarchy structure 16. The fetch module 11 is used to fetch an instruction to be executed and provide the instruction to the decoding module 12. The decoding module 12 understands the semantic of the obtained instruction and transmits it to the execution module 13. The execution module 13 executes the decoded instruction according to its semantic and writes back the new value of the modified memory unit through the MMU 15', or writes back the new value of the modified register through the committing module 14. The committing module 14 writes back the new value of the modified register and updates a program counter in order to make the fetch module 11 to fetch the next instruction. MMU 15' maps the target virtual memory space to the target physical memory space, and this is necessary for all the memory-related instructions. The memory hierarchy structure 16 simulates the memory hierarchy structure of the target system, for example, a dedicated L1 cache and a shared L2 cache, and maps the target physical space to the main memory space of the simulator.

As compared to the prior art function simulator, the function simulator in the present invention's embodiment comprises an access record extracting module for obtaining memory access records of instructions. In the following discussion about an example, the module is set in the MMU 15'. When the execution module 13 is executing the semantic of an instruction, if the semantic involves accessing the memory hierarchy structure 16, the memory access is performed through the MMU 15'. In response to this, the access record extracting module associated with the MMU 15' extracts information relating to the instruction, i.e., the memory access record, including an identification of the CPU for executing the instruction, an identification of the instruction, and the address of the accessed memory location. According to the types of the hardware/software architectures and operation systems which the function simulator implementation is based on, various ways may be adopted to implement the function of the above access record extracting module. For example, in case of adopting WINDOWS operation system, it is possible to utilize the hook mechanism to intercept events resulted from the memory access by the MMU 15', thus obtaining the information of the memory access records. This module may also be set outside the MMU 15'.

As shown in FIG. 4, the method of the present invention begins at step S1, where the execution of a program is simulated by the function simulator 10', and the memory access records are obtained by the access record extracting module.

As shown in FIG. 3, the synchronization control system 40 based on threads comprises a thread generator 41, a thread database 42 and a synchronizing device 43. The synchronization control system 40 may be implemented based on a computer.

As shown in FIG. 4, when the function simulator 10' completes the simulated execution of the executable program, then at step S2, the thread generator 41 of the synchronization control system 40 obtains the memory access records extracted by the function simulator 10'. The transmission of memory access records between the synchronization control system 40 and the function simulator 10' may be implemented through direct communication or intermediate storage. Then at step S3, the thread generator 41 analyses the accumulated memory access records, wherein in view of the address of each accessed memory unit present in the memory access records, sets of instructions are found from the accumulated memory access records, where each set includes instructions involved the accesses from different processors to the same memory unit address. I.e., for that address, it is determined whether the accumulated memory access records show that different processors have accesses the memory unit indicated by that address. If so, all the memory access records including said different processors and the address are found out, and the instructions identified by these memory access records form one of such sets. There are various possible variations of the method for finding such sets. Then at step S4, the thread generator 41 stores the found sets in the thread database 42.

As shown in FIG. 3, the cycle-accurate simulator 20' comprises several parallel simulation units 20-1 to 20-n. Each parallel simulation unit simulates one processor, and its work flow is similar to one serial cycle-accurate simulator. Each parallel simulation unit maintains its own present simulation time.

Each parallel simulation unit comprises a fetching module 21, a decoding module 22, an issuing module 23, a functional unit 24, a writing back module 25, a committing module 26, a MMU 27' and a memory hierarchical structure 28. The fetching module 21 is used to fetch an instruction to be executed and provide the instruction to the decoding module 22. The decoding module 22 understands the semantic of the obtained instruction and transmits it to the issuing module 23. The issuing module 23 allocates a temporary register, i.e., renamed register for the instruction, and allocates the register to a respective functional unit 24. The functional unit 24 executes the instruction to be executed according to its semantic and writes back the new value of the modified memory unit through the MMU 27', or writes back the new value of the modified register through the writing back module 25 and the committing module 26. The writing back module 25 writes back the modified temporary register, i.e., the new value of the renamed register. The committing module 26 writes back the new value of the modified register modified by the instruction and updates a program counter in order to make the fetching module 21 to fetch the next instruction. MMU 27' maps the target virtual memory space to the target physical memory space, and this is necessary for all the memory-related instructions. The memory hierarchical structure 28 simulates the memory hierarchy structure of the target system, for example, a dedicated L1 cache and a shared L2 cache, and maps the target physical space to the main memory space of the present simulating unit. As compared to the execution module in the function simulator, the issuing modules, functional units and writing back modules in the parallel simulation units in the cycle-accurate simulator may be considered as a more complicated pipeline 30.

As shown in FIG. 4, after step S4, at step S5, the above executable program is executed by respective parallel simulation units of the cycle-accurate simulator 20'.

Figure 5:
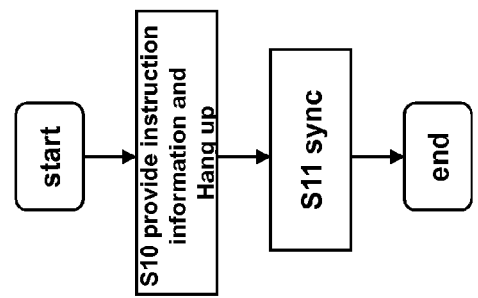
FIG. 5 is a flow chart specifically showing a control procedure of memory access synchronization in step S5 of FIG. 4.

FIG. 5 is a flow chart specifically showing a control procedure of memory access synchronization in step S5 of FIG. 4.

As compared to the prior art parallel cycle-accurate simulator, the parallel simulation units of the cycle-accurate simulator 20' according to the embodiment of the present invention may comprise a memory access control module. In the following discussion about an example, the module is implemented in the MMU 27'.

As shown in FIG. 5, at step S10, the synchronizing device 43 obtains information for identifying the instruction causing access to the memory hierarchical structure 28 from the MMU 27' (i.e., memory access control module). When the functional unit 24 is executing the semantic of an instruction, if the semantic involves accessing the memory hierarchy structure 28, the memory access is performed through the MMU 27'. In response to this, the information on the instruction, i.e., the identification of the instruction is provided from the MMU 27' by the memory access control module associated with the MMU 27'. According to the types of the hardware/software architectures and operation systems which the cycle-accurate simulator implementation is based on, various ways may be adopted to collect and provide the identification information on the instructions. For example, in case of adopting WINDOWS operation system, it is possible to utilize the hook mechanism to intercept events resulted from the memory access by the MMU 27', thus obtaining the identification information of the instruction which the memory access is based on. This memory access control module may also be implemented outside the MMU 27'.

Alternatively, the above information for identifying instructions provided by the MMU 15' and MMU 27' may be based on instruction addresses in the executable program image.

It should be noted that, the instruction identification information is provided to the synchronizing device 43 before the MMU 27' actually performs the memory access. At this time, the memory access control module makes the actual memory access of the MMU 27' being hung up, until the synchronizing device 43 completes synchronization processing at step S11.

At step S11, when the synchronizing device 43 receives the instruction identification information from the MMU of a parallel simulation unit, compares it with the instruction identification information in respective sets stored in the thread database 42, and if it matches with the instruction identification information in a set, identifies that the memory access to be performed by the MMU needs synchronization and performs synchronization control on the memory access.

The synchronizing device 43 is in charge of maintaining a global simulation time of the parallel cycle-accurate simulator. The global simulation time equals to the minimum value among all the parallel simulation unit simulation times. The synchronizing device 43 may obtain the global simulation time by checking the present simulation times of all the parallel simulation units and finding the minimum value by comparison.

As an example, when the synchronizing device 43 receives the instruction identification information from the MMU of a parallel simulation unit and determines that the execution of the corresponding instruction needs synchronization, the synchronizing device 43 firstly blocks the simulation work of the MMU for the present processor, waits for the virtual time of the processor to be equal to the global virtual time, and then notifies its MMU to resume the simulation. In the present parallel simulating system, the simulation work flow of the MMU is the same as that of the MMU in a serial simulator. Thus the synchronizing device has a function of adjusting the occurrence times of the MMU's simulation actions, but not altering the MMU's internal mechanism.

For example, assume that a parallel simulator has three parallel simulation units, processors P0, P1 and P2. The simulation time of P0 is 100 seconds, the simulation time of P1 is 101 seconds, the simulation time of P2 is 102 seconds, and then the present global simulation time is 100 seconds. Assuming that the instructions executed by P0, P1 and P2 at this time are marked as needing synchronization in the thread database, their executions are hung up in the synchronizing device 43. At this time, the synchronizing device 43 determines that P1 and P2 must wait because the simulation times of them are greater than the global simulation time, and P0 may start its simulated actions by the MMU because its simulation time is equal to the global simulation time. Assuming that the time is 103 seconds when P0 completes its simulated action by the MMU, the global simulation time increases at 101 seconds and the synchronizing device 43 determines that P1 may also start its simulated action by the MMU, and P2 still needs waiting. Further assuming that the time is 104 seconds when P1 completes its simulated action by the MMU, the global simulation time becomes 102 seconds and the synchronizing device 43 determines that P2 may also start its simulated action by the MMU.

As an alternative way, when the MMU of a parallel simulation unit executes an instruction, the memory access control module firstly queries the thread database to see if the instruction needs synchronization. If its needs no synchronization, it is possible to directly perform the corresponding simulation operation by the MMU, and if otherwise, the memory access control module performs control so that the MMU of the parallel simulation unit autonomously blocks the execution of the instruction, and waits for its simulation time to be equal to the global simulation time so as to resume its corresponding operations. This manner is the so-called autonomous manner. In this situation, the synchronizing device only needs to maintaining the global simulation time, or the synchronizing device may be omitted, and the memory access control module of the MMU may autonomously obtain the global simulation time (for example, taking the minimum value among the present simulation times of all the MMUs as the global simulation time).

Although the device for storing the sets is described as the thread database in the above, it is also possible to adopt other means known in the art for storing, and the storage function may be independent, or may also be integrated in the function simulator or cycle-accurate simulator. Similarly, the thread generator may also be integrated in the function simulator, and the synchronizing device may be integrated in the cycle-accurate simulator.

Further, although in the above embodiments the function simulator, the cycle-accurate simulator and the synchronization control system are described as separated portions, one skilled in the art knows that they can be combined arbitrarily in specific implementations. Although in the above embodiments the parallel simulation units are described as separated portions, they can be implemented by using centralized or distributed parallel computing techniques in specific implementations. In addition, communications between respective units in the above embodiments may adopt wired or wireless communication techniques such as bus, network, shared memory, DMA, interruption, message, pipe, event, dedicated connection and so on.

Although the criteria for identifying the set are determined as access to the same memory address by different processors in the embodiments, it is possible to design other identifying criteria according to specific implementations. Preferably, the identified sets should comprise at least one instruction that at least causes a write access.

The above-disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

That which is claimed is:

1. A simulating system for simulating a multiprocessor system, comprising:
   a computer processor;
   a function simulator said function simulator further comprises an access record extracting module for obtaining a memory access record of an instruction by the computer processor, wherein said memory access record of the instruction includes information for identifying the processor for executing the instruction associated therewith, the instruction, and the access memory location associated therewith; and
   a parallel cycle-accurate simulator comprising a plurality of parallel simulation units, each of parallel simulation units of said parallel cycle-accurate simulator further comprises a memory access control module for providing information for identifying an instruction causing an access to a memory hierarchy structure; and a synchronization control system, the synchronization control system comprising:

a) an identifying unit for identifying sets of instructions, memory accesses of each set being necessary to be synchronized, according to memory access records of instructions provided by said access record extracting module when the execution of an executable program by said multiprocessor system is simulated in said function simulator; and b) a synchronizing unit for determining execution of instructions in one of said sets by said parallel simulation units according to said information provided by said memory access control module, so that the memory accesses of said instructions are performed in the order corresponding to global simulation times of the instructions;

wherein said memory access control module is configured to hang up the execution of respective memory accesses before the completion of memory access synchronization, and resume the execution of the hung up memory accesses in response to a control from said synchronizing unit.

2. The simulating system according to claim 1, characterized in that, said access record extracting module is associated with a memory management unit of said function simulator.

3. The simulating system according to claim 1, wherein said memory access record of the instruction includes information for identifying the processor for executing the instruction associated therewith, the instruction, and the access memory location associated therewith.

4. The simulating system according to claim 3, wherein said identifying unit is further configured to identify each of said sets as a set of instructions executed by different processors to access the same memory location.

5. The simulating system according to claim 4, wherein said memory access record of the instruction further includes information for identifying the read/write types of the memory access, and said identifying unit is further configured to identify each of said sets as a set of at least one instructions that at least cause a write access.

6. The simulating system according to claim 1, wherein said synchronization control system further comprises storing unit for storing said sets.

7. The simulating system according to claim 1, wherein said memory access control module is associated with the memory management unit of the parallel simulation unit to which it belongs.

8. A method of performing memory access synchronization control in a simulating system for simulation of a multiprocessor system, said simulating system comprising a function simulator and a cycle-accurate simulator, the method comprises:

simulating, through said function simulator, the execution of an executable program by said multiprocessor system, wherein memory access records of instructions are obtained, wherein said memory access record of the instruction includes information for identifying the processor for executing the instruction associated therewith, the instruction, and the access memory location associated therewith;

identifying sets of instructions where each of the sets need a synchronization according to said memory access records of said instructions; and simulating, through said parallel cycle-accurate simulator, the execution of the executable program by said multiprocessor system, wherein each of parallel simulation units of said parallel cycle-accurate simulator is configured to provide information for identifying an instruction causing an access to a memory hierarchy structure so as to determine execution of instructions in one of said sets by said parallel simulation units according to said information, so that the memory accesses of said instructions are performed in the order corresponding to global simulation times of the instructions, and wherein said parallel simulation units are configured to hang up the execution of respective memory accesses before the completion of said synchronization, and resume the execution of the hung up memory accesses in said order.

9. The method according to claim 8, wherein said obtaining step is performed by a memory management unit of said function simulator.

10. The method according to claim 8, wherein said identifying step further comprises identifying each of said sets as a set of instructions executed by different processors to access the same memory location.

11. The method according to claim 10, wherein said memory access record of the instruction further includes information for identifying the read/write types of the memory access, and said identifying step further comprises identifying each of said sets as a set of at least one instruction that at least cause a write access.

12. The method according to claim 8, further comprising storing said sets.

13. The method according to claim 8, wherein said step of providing the information for identifying the instruction causing the access to the memory hierarchy structure is performed by a memory management unit of said parallel simulation unit.

14. A computer program product embodied in computer readable medium for performing memory access synchronization control in a simulating system for simulation of a multiprocessor system, said simulating system comprising a function simulator and a cycle-accurate simulator, the computer program product comprising computer executable code for:

simulating, through said function simulator, the execution of an executable program by said multiprocessor system, wherein memory access records of instructions are obtained, wherein said memory access record of the instruction includes information for identifying the processor for executing the instruction associated therewith, the instruction, and the access memory location associated therewith;

identifying sets of instructions where each of the sets need a synchronization according to said memory access records of said instructions; and simulating, through said parallel cycle-accurate simulator, the execution of the executable program by said multiprocessor system, wherein each of parallel simulation units of said parallel cycle-accurate simulator is configured to provide information for identifying an instruction causing an access to a memory hierarchy structure so as to determine execution of instructions in one of said sets by said parallel simulation units according to said information, so that the memory accesses of said instructions are performed in the order corresponding to global simulation times of the instructions, and wherein said parallel simulation units are configured to hang up the execution of respective memory accesses before the completion of said synchronization, and resume the execution of the hung up memory accesses in said order.

15. The computer program product according to claim 14, wherein said memory access record of the instruction includes information for identifying the processor for executing the instruction associated therewith, the instruction, and the access memory location associated therewith.

16. The computer program product according to claim 15, wherein said computer executable code for identifying sets of instructions further comprises computer executable code for identifying each of said sets as a set of instructions executed by different processors to access the same memory location.

17. The computer program product according to claim 16, wherein said memory access record of the instruction further includes information for identifying the read/write types of the memory access, and said identifying step further comprises identifying each of said sets as a set of at least one instruction that at least cause a write access.

18. The computer program product according to claim 14, further comprising computer executable code for storing said sets.

19. The computer program product according to claim 14, wherein said computer executable code for providing the information for identifying the instruction causing the access to the memory hierarchy structure is performed by a memory management unit of said parallel simulation unit.

* * * * *